Patented Nov. 23, 1937

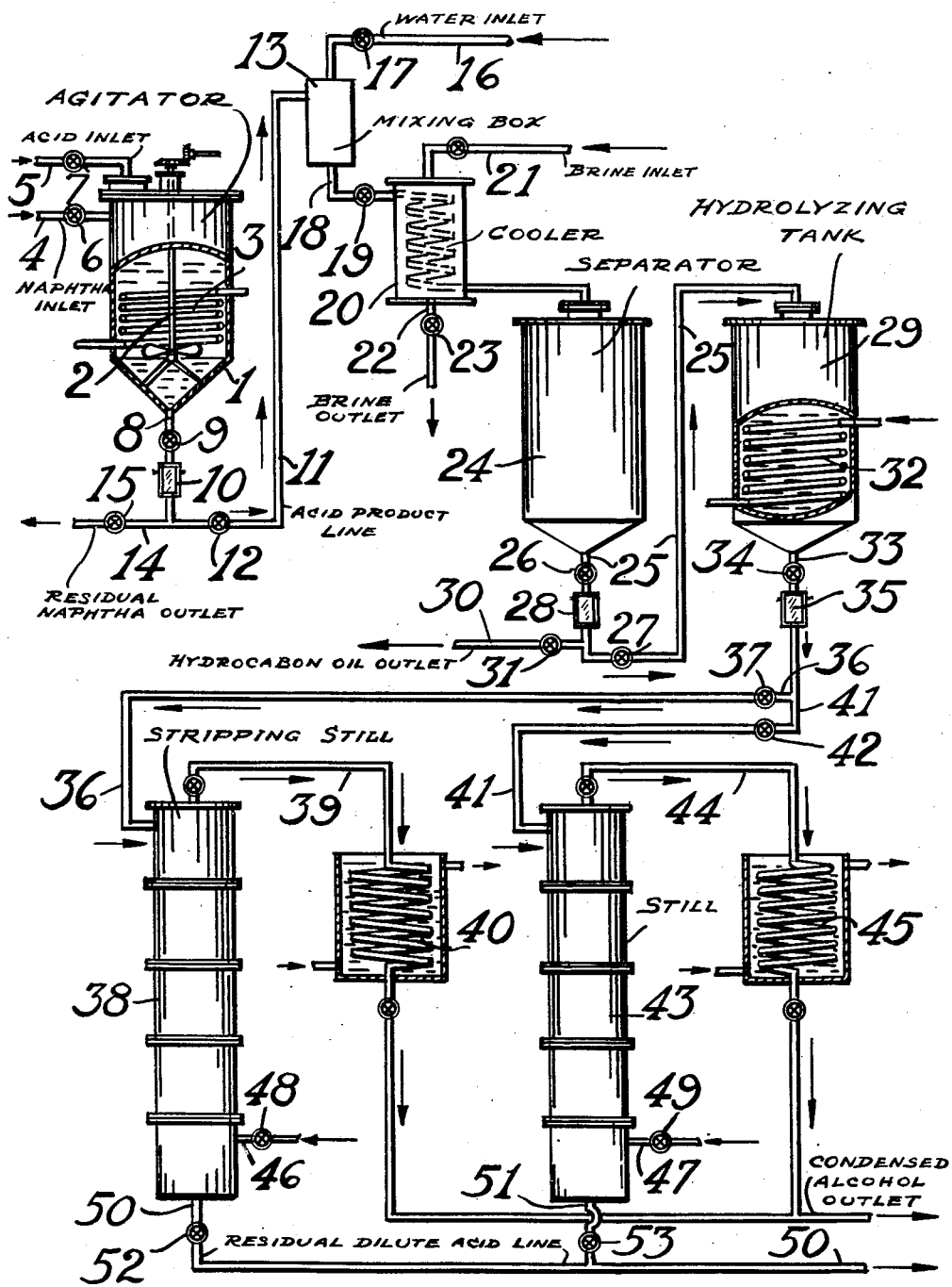

2,099,855

UNITED STATES PATENT OFFICE 2,099,855

METHOD OF HYDROLYZING REACTIVE ACID LIQUOR

Robert B. Lebo, Elizabeth, N. J., and Benjamin T. Brooks, Old Greenwich, Conn., assignors to Standard Alcohol Company, a corporation of Delaware Application December 10, 1935, Serial No. 53,708

8 Claims. (Cl. 260—156)

The present invention relates to improvements in the manufacture of secondary alcohols by the action of sulfuric acid on olefins. More particularly it relates to the manufacture of secondary alcohols for four to six carbon atoms, or mixtures of these alcohols with amyl and higher alcohols present in a preponderance, in a state of purity, and with good yields.

In the usual processes for manufacturing secondary alcohols, especially alcohols containing five and six carbon atoms to the molecule, olefinic hydrocarbons are treated with sulfuric acid, phosphoric acid, etc., under appropriate esterifying conditions, and the acid reaction product is diluted with water and the diluted mixture is heated, hydrolyzed with resultant separation into three layers wherein considerable impurities are mixed with the alcohols and are recovered so admixed on subsequent distillation. The alcohols which accumulate in the middle layer in large quantities are good solvents for the polymers and impurities. The middle and bottom layer are distilled from the acid usually with steam. In this process part of the hydrocarbon polymers contained in the original acid product are distilled with the alcohol and it is difficult or even at times impossible to separate the alcohol and hydrocarbon impurities by fractional distillation. It has also been noted that a substantial proportion of the alcohol or alkyl ester is converted to olefin during the distillation of the diluted acid reaction product. This reversion to olefin is decreased by diluting with large proportions of water. The use of large proportions of water for dilution greatly increases the cost of re-concentrating the acid, so that when using such a process a compromise must be made between cost of re-concentrating acid and loss of alcohol by reversion to olefin. Also the use of large proportions of water increases the impurities in the distilled alcohol.

An object of this invention is to improve the purity and yield of the product by controlling the hydrolysis whereby the hydrocarbons will not admix with the alcohols. Other objects are to remove the polymers before the acid product is completely hydrolyzed and to keep the heavier alcohols in solution by adding mutual solvents.

The present invention consists essentially in first controlling the dilution of the acid reaction mixture with respect to temperature, proportion of water added and proportions of combined and free acid, so that complete hydrolysis of the alkyl ester to alcohol and acid is prevented or minimized, the hydrocarbon impurities removed, as, for example, by stratification and decantation. Secondly, the diluted reaction product, after removal of the hydrocarbon impurities, is hydrolyzed, usually by warming, until most of the alkyl esters are hydrolyzed and the liquid separates into two phases; the two phases are then separately distilled in order to minimize the reversion to olefin.

Hydrocarbons generally, including the polymers of butenes, amylenes and hexylenes, are very insoluble in sulfuric acid of the concentrations employed in sulfating these olefins to alkyl sulfates. However, as the concentration of the alkyl sulfates increases in the acid reaction mixture the hydrocarbon polymers become more and more soluble in it. It was found that when carrying out the process with good acid efficiencies, i. e. high concentration of alkyl sulfate in the acid product, the alcohol, obtained by diluting and distilling, contains more hydrocarbon impurities than when the acid efficiencies are poor. These hydrocarbon impurities are highly objectionable when these alcohols or derivatives, esters or ketones, are used as solvents, as, for example, for nitrocellulose lacquers.

When the reaction is carried out in the presence of excess inert naphtha, the naphtha takes up a portion of the hydrocarbon polymers, but since the polymers are also soluble in the acid alkyl sulfate mixture it is impossible entirely to remove the polymers and other impurities from the acid reaction mixture by means of excess naphtha. The polymers are also objectionable as constituents of naphtha for most purposes.

It was found according to this invention that the secondary alkyl sulfates are not rapidly hydrolyzed by water below 25° C. even though an excess or free sulfuric acid causes the hydrolysis to occur more rapidly. The restriction of the proportion of water used for diluting the acid product prevents or minimizes the separation of butyl, amyl and hexyl alcohols, and most of the hydrocarbon oil can be thrown out of solution in the acid reaction mixture by small proportions of water. It was also found that by control of temperature alone, that is, keeping it low, causes a separation of polymer, and after removal the heavier layer may be completely hydrolyzed and treated as above. After the removal of the hydrocarbons the diluted reaction mixture may be completely hydrolyzed by warming, yielding two liquid phases, of which the lighter or upper layer, after stratification, consists mainly of alcohol and water and very little sulfuric acid; while the heavier phase contains most of the sulfuric acid and water, with only small proportions of alcohol. By distilling separately the two liquid phases thus obtained, very little reversion to olefin takes place, and the alcohols contain fewer impurities than if the alkyl sulfates had been completely hydrolyzed in one step.

It may be noted that the series of steps described above are closely related. If the hydrocarbons are not removed before the final hydrolysis step, a separation into three layers, or phases, may occur, and the uppermost or hydrocarbon layer may contain twenty per cent or more of alcohol, and the middle layer will contain the bulk of the alcohol along with considerable polymer and impurities, the separation of these undesirable bodies by distillation being difficult. If the hydrolysis is carried nearly to completion prior to distillation, most of the alcohol, in the case of amyl and hexyl alcohols, may pass into solution with the hydrocarbon in the middle phase.

The process of the present invention will be more clearly understood from the following specific examples, in which sulfuric acid is used in preparing the acid liquor. This is for illustration only, as other acids, such as phosphoric acid, etc. may be used.

Example 1

100 parts by weight of pure amylene were treated with 170 parts by weight of 85% sulfuric acid until the hydrocarbon was completely dissolved. The reaction mixture was then diluted with 220 parts of water, with cooling to prevent hydrolysis. No separation of amyl alcohol occurred, but on further dilution with 80 parts of water, a portion of the alcohol separated and collected as an upper layer.

Example 2

A closely cut fraction of naphtha made by a cracking process, containing about 35% by volume of olefins and consisting of about 75% pentane and pentenes, was treated with 90% sulfuric acid, with cooling, in the ratio of 1,000 gallons of naphtha to 100 gallons of sulfuric acid. On diluting 100 volumes of the acid product with 100 volumes of cold water, with cooling, the mixture separated into two layers. The mixture was permitted to stand without agitation until stratification occurred. Analysis of the hydrocarbon layer showed 4% alcohol. The acid alkyl sulfate solution in the heavier layer was then removed and warmed to about 40–60° C. until hydrolysis was complete and stratification again took place. Analysis showed that the upper layer contained 5% sulfuric acid and the lower layer 28% free sulfuric acid. The two layers were separated and distilled separately with steam, and the distillates analyzed for pentene. The reversion to pentene during distillation was 5%. Another portion of the acid product was hydrolyzed for two hours at 50° C. and distilled with steam without separating the various layers, and the reversion to amylene was found to be 18% of the amylene originally extracted by the acid.

The process is shown diagrammatically in the accompanying drawing. Numeral 1 designates an agitator, provided with an agitating device 2, cooling coils 3 and inlet pipes 4 and 5, furnished with valves 6 and 7, for cracked naphtha and sulfuric acid, an outlet pipe 8, provided with a valve 9, and a sight glass box 10, through which the acid product and residual naphtha are withdrawn. The acid product flows through the outlet pipe 8 and pipe 11, provided with valve 12, into mixing box 13. When the acid product has been removed, the residual naphtha can be withdrawn through pipe 8 and pipe 14, provided with valve 15. It will be understood that it is sometimes advantageous to provide a separate settling tank for the separation of the residual naphtha and acid product, and that the process can be operated continuously or by the batch method by means of well understood mechanical arrangements.

The acid product passed by means of the pipe 11 to the mixing box 13, is mixed with water introduced through the inlet pipe 16, provided with valve 17. The diluted acid product then passes through the pipe 18, provided with valve 19, to the cooler 20, cooling liquid, for example, cold brine, being circulated through suitable inlet and outlet pipes 21 and 22, provided with valve 23.

The diluted and cooled acid product is then passed to the separator 24, where the hydrocarbon material, including hydrocarbon polymers, are permitted to settle out and stratify. It will be understood that other means of separating the hydrocarbon oil and the diluted acid product may be employed, as for example, a centrifugal separator. After the mixture has stratified in the separator 24, the acid product is withdrawn through the outlet pipe 25, provided with valves 26 and 27, and visible sight box 28, and passed through the pipe 25 to the hydrolyzing tank 29. When the heavier acid product has been removed and hydrocarbon oil begins to flow through the visible sight box 28, the hydrocarbon oil is then passed through the pipe 30, provided with valve 31, to storage or other separate disposal.

The hydrolyzer 29 is provided with means for heating, as by a suitable coil 32 for hot water or steam. When the alkyl sulfates in the diluted acid product are hydrolyzed and stratification has taken place, the separate layers are removed by withdrawing them through the outlet pipe 33, provided with valve 34 and the visible sight box 35. The lower heavier layer is passed by the pipe 36, provided with valve 37, to the stripping still 38, where the relatively small alcohol content is distilled, the vapors passing through the pipe 39, through a suitable condenser 40, to storage.

When the acid-rich layer, first removed, has thus been separated, the alcohol rich phase, or upper layer, is passed by the pipe 41, provided with valve 42, to the still 43, where the alcohol content is distilled, the vapors passing through the pipe 44, through a suitable condenser 45, to storage. The distilling columns 38 and 43 are preferably heated by steam, introduced through the inlets 46 and 47, provided with valves 48 and 49.

The alcohol condensates from the condensers 40 and 45 may be combined for further purification and distillation. The residual dilute acid flows from the bottom of the stills by means of the outlet pipes 50 and 51, provided with valves 52 and 53, and may be combined for purposes of reconcentration or other disposal.

As further illustration as to what may be obtained by controlled hydrolysis, the following comparative results are shown showing a substantial elimination of polymer from the alcohol.

Acid extract hydrolyzed in the usual manner to obtain three layers results in a polymer layer of 98 cc., containing 8% alcohol. This results from a mixture of 1 liter of extract and 1.2 liters of water. By controlling the hydrolysis so that only two layers form, that is, a polymer layer and a lower layer containing a mixture of alcohol, water and acid, the polymer layer is larger.

For example, using extract in water in the identical proportions as above and keeping the temperature low—say below 25° C.—the polymer layer is 117 cc., containing 6% alcohol. Thus, it is evident that more polymer has separated and a pure alcohol product results after distillation.

Furthermore, in the manufacture of higher secondary alcohols, extreme difficulty is encountered in the step of hydrolysis due to the fact that three layers form upon the addition of water followed by heating. The existence of these three layers causes manufacturing difficulties and prevents the complete removal of hydrocarbon impurities from the alcohol. This is due to the fact that one of the layers contains such a high concentration of alcohol that it is a good solvent for petroleum hydrocarbons and sulfur compounds.

Another method of overcoming this three layer formation is by adding isopropyl alcohol or the reactive acid liquor of isopropyl alcohol to the reactive liquor of the higher alcohol and conducting the hydrolysis by the addition of water in the usual way obtaining only two layers. Isopropyl alcohol acts as a mutual solvent for water, acid and higher alcohols (amyl) effecting a separation of polymer from higher alcohols. In case the isopropyl acid liquor is added, the hydrolysis of the two liquors is carried out simultaneously. The quantity of isopropyl alcohol added should be just sufficient to prevent the formation of three layers. It is necessary to have present somewhat over one-half gallon of isopropyl alcohol for every gallon of higher alcohol. However, a partial purification of the products and simplification of the hydrolysis step can be effected by using a smaller quantity of isopropyl alcohol. However, this is not desirable. The acid liquor can then be treated by the process outlined above.

After the hydrolysis the alcohol mixture is separated from the acid and subjected to fraction distillation, wherein the isopropyl alcohol is separated from the other alcohols which will be in a higher state of purity than would be the case were the isopropyl alcohol left out. For example, the following tables are submitted to illustrate the amount of polymer formed. Where three layers in the hydrolysis step are formed the following proportions of products were obtained where a low proportion of polymer on the main product, which is amyl alcohol, is obtained:

| | Percent |
|---|---|
| Amyl alcohol | 46.5 |
| Hexyl alcohol | 2.9 |
| Polymer bodies | 13.7 |

The ratio of polymer bodies over amyl alcohol equaled .29.

When equal quantities of isopropyl extract and amyl extract were mixed and then hydrolyzed, the proportions of the same finished products were as follows:

| | Percent |
|---|---|
| Amyl alcohol | 37 |
| Hexyl alcohol | 3 |
| Polymer bodies | 1.9 |

The ratio of polymer bodies over amyl alcohol equaled .051.

These data indicate that there is a 5 fold reduction in the proportion of polymer to amyl alcohol by employing the idea embodied in this particular invention. As a consequence of this polymer reduction, the quality of the alcohol would be improved, with a simplification of the subsequent distilling and purification steps.

The foregoing descriptions are merely illustrative, and various changes and alternative arrangements may be made within the scope of the appended claims, in which it is our intention to claim all inherent novelty in the invention as broadly as the prior art permits.

We claim:

1. Method of manufacturing secondary alcohols by reaction of acids with olefins, which comprises reacting hydrating acids and olefins, diluting the acid reaction products, maintaining a temperature below about 25° C., settling the mixture into two layers, an acid liquor layer and a polymer layer, separating the layers, diluting the acid liquor layer, maintaining a temperature at which hydrolysis takes place, settling into two layers, and separately distilling alcohol from both layers.

2. Method of manufacturing secondary alcohols by the reaction of acids with olefins, which comprises reacting hydrating acid catalysts and olefins, diluting the acid reaction products, maintaining a temperature below about 25° C., settling the mixture into two layers, an acid liquor layer and a polymer layer, separating the layers, diluting the acid liquor layer, and maintaining a temperature of about 50–60° C., settling into two layers, and separately distilling alcohol from both layers.

3. Method of manufacturing secondary alcohols by the reaction of acids with olefins, which comprises reacting hydrating acid catalysts and olefins having 4–6 carbon atoms to a molecule, diluting the acid reaction products, maintaining a temperature below about 25° C., settling the mixture into two layers, an acid liquor layer and a polymer layer, separating the layers, diluting the acid liquor layer, and maintaining a temperature of about 50–60° C., settling into two layers, and separately distilling alcohol from both layers.

4. Method of manufacturing secondary alcohols having from 4–6 carbon atoms to the molecule, which comprises reacting 85–90% sulfuric acid with an olefin having from 3–6 carbon atoms per molecule, diluting the acid reaction products, maintaining a temperature below about 25° C., settling the mixture into two layers, an acid liquor layer and a polymer layer, separating the layers, diluting the acid liquor layer, and maintaining a temperature of about 50–60° C., settling into two layers, and separately distilling alcohol from both layers.

5. Method of manufacturing secondary alcohols by the reaction of acids with olefins, which comprises reacting hydrating acid catalysts and olefines, mixing the acid reaction products with acid reaction products formed by reacting acids and olefins having less carbon atoms in the molecules, diluting the acid reaction products, maintaining a temperature at which hydrolysis takes place, settling the mixture into two layers, an acid layer and a polymer layer, distilling alcohol from the acid layer.

6. Method of manufacturing secondary alcohols by the reaction of acids with olefins, which comprises reacting hydrating acid catalysts and olefins, diluting the acid reaction products, maintaining a temperature below about 25° C., settling the mixture into two layers, an acid liquor layer and a polymer layer, separating the layers, heating the acid liquor layer, and maintaining a temperature of about 50-60° C., settling into two layers, and separately distilling alcohol from both layers.

7. Method of manufacturing amyl alcohol which comprises reacting the sulfuric acid of 80 to 90% concentration with amylene, mixing the acid reaction products with an acid reaction product obtained by reacting sulfuric acid with propylene, diluting the acid reaction products, maintaining a temperature above about 25° C., settling the mixture into two layers, an acid liquor layer and a polymer layer, separating the layers, and distilling alcohol from the acid liquor layer.

8. Method of manufacturing amyl alcohol, which comprises reacting sulfuric acid of 80-90% concentration with amylene, diluting the acid reaction products, maintaining a temperature below about 25° C., settling the mixture into two layers, an acid liquor layer and a polymer layer, separating the layers, diluting the acid liquor layer, and maintaining a temperature of about 50-60° C., settling into two layers, and separately distilling alcohol from both layers.

ROBERT B. LEBO.
BENJAMIN T. BROOKS.